United States Patent
Pace et al.

(10) Patent No.: US 9,445,289 B2
(45) Date of Patent: *Sep. 13, 2016

(54) SYSTEM AND METHOD FOR CONVERGENCE AND AUTOMATIC DISABLING OF ACCESS POINTS IN A WIRELESS MESH NETWORK

(71) Applicant: Silver Spring Networks, Inc., Redwood City, CA (US)

(72) Inventors: James Pace, San Francisco, CA (US); Jana Van Greunen, Woodside, CA (US); Sterlings Hughes, Oakland, CA (US); George H. Flammer, III, Cupertino, CA (US); William E. San Filippo, Los Altos, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,509

(22) Filed: Oct. 20, 2015

(65) Prior Publication Data

US 2016/0050570 A1    Feb. 18, 2016

Related U.S. Application Data

(63) Continuation of application No. 13/339,071, filed on Dec. 28, 2011, now Pat. No. 9,173,111.

(51) Int. Cl.
| | | |
|---|---|---|
| *H04W 40/04* | (2009.01) | |
| *H04W 24/02* | (2009.01) | |
| *H04W 36/08* | (2009.01) | |
| *H04W 36/22* | (2009.01) | |
| *H04W 36/30* | (2009.01) | |
| *H04W 48/20* | (2009.01) | |

(Continued)

(52) U.S. Cl.
CPC .......... *H04W 24/02* (2013.01); *H04L 45/122* (2013.01); *H04W 40/00* (2013.01); *H04W 40/02* (2013.01); *H04W 84/18* (2013.01)

(58) Field of Classification Search
CPC ... H04W 40/00; H04W 40/22; H04W 48/00; H04W 48/20; H04W 24/02; H04W 28/02; H04W 28/0284; H04W 28/0289; H04W 84/18; H04L 45/122
See application file for complete search history.

(56) References Cited

U.S. PATENT DOCUMENTS 3,920,975 A * 11/1975 Bass ................... G06F 11/2294
                                                714/4.2
4,837,812 A *  6/1989 Takahashi ................ H04B 3/00
                                                358/434

(Continued)

*Primary Examiner* — Ahmed Elallam
(74) *Attorney, Agent, or Firm* — Artegis Law Group, LLP

(57) ABSTRACT

One embodiment of the present disclosure sets forth a technique for convergence and automatic disabling of access points in a wireless mesh network. Specifically, an access point within a wireless mesh network computes one or more network metrics to determine whether the metrics are unfavorable or favorable. If the network metrics are favorable, then the access point disables the access point's network connection. An access point turns the network connection back on based on whether a routing was lost for at least a preset amount of time, utilization of one or more neighboring access points is above a preset value, or one or more network metrics have degraded by a certain percentage value. One advantage of this approach is that cost savings may be achieved when the number of access points dynamically changes to accommodate varying communications conditions.

21 Claims, 8 Drawing Sheets

(51) Int. Cl.
*H04W 40/00* (2009.01)
*H04L 12/733* (2013.01)
*H04W 40/02* (2009.01)
*H04W 84/18* (2009.01)

(56) References Cited

U.S. PATENT DOCUMENTS

| | | | | |
|---|---|---|---|---|
| 4,870,408 A * | 9/1989 | Zdunek | | H04W 84/08 370/327 |
| 5,127,041 A * | 6/1992 | O'Sullivan | | H04W 88/02 379/93.05 |
| 5,388,101 A * | 2/1995 | Dinkins | | H04B 7/15514 348/E7.07 |
| 5,481,546 A * | 1/1996 | Dinkins | | H04B 7/15514 348/E7.07 |
| 5,592,491 A * | 1/1997 | Dinkins | | H04B 7/15514 348/E7.07 |
| 7,907,582 B2 * | 3/2011 | Du | | H04W 48/20 370/252 |
| 8,023,426 B2 * | 9/2011 | Liu | | H04L 45/20 370/238 |
| 8,023,444 B2 * | 9/2011 | Bowser | | G06F 1/3203 370/311 |
| 8,248,949 B2 * | 8/2012 | Ozer | | H04W 84/22 370/237 |
| 8,374,080 B2 * | 2/2013 | Chu | | H04W 72/1252 370/229 |
| 8,537,735 B2 * | 9/2013 | Bowser | | G06F 1/3203 370/310 |
| 8,774,040 B2 * | 7/2014 | Sakai | | H04W 28/18 370/252 |
| 9,173,111 B2 * | 10/2015 | Pace | | H04W 40/00 |
| 2004/0156345 A1 | 8/2004 | Steer et al. | | |
| 2005/0053005 A1 * | 3/2005 | Cain | | H04L 45/00 370/235 |
| 2006/0106490 A1 * | 5/2006 | Howell | | G07F 9/006 700/233 |
| 2007/0127386 A1 * | 6/2007 | Joshi | | H04L 45/00 370/252 |
| 2007/0206547 A1 | 9/2007 | Gong et al. | | |
| 2007/0280275 A1 * | 12/2007 | Castagnoli | | H04W 40/24 370/406 |
| 2007/0291660 A1 * | 12/2007 | Robson | | H04W 24/00 370/252 |
| 2008/0025270 A1 * | 1/2008 | Moon | | H04W 40/14 370/338 |
| 2009/0010190 A1 * | 1/2009 | Gong | | H04L 45/26 370/311 |
| 2009/0154359 A1 * | 6/2009 | Strutt | | H04W 40/02 370/238 |
| 2009/0186584 A1 * | 7/2009 | Lambrecht | | H04W 52/42 455/67.11 |
| 2009/0213821 A1 * | 8/2009 | Fonseca, Jr. | | H04W 52/0225 370/338 |
| 2010/0002610 A1 * | 1/2010 | Bowser | | G06F 1/3203 370/311 |
| 2010/0011098 A1 * | 1/2010 | Sanborn | | H04L 67/104 709/223 |
| 2010/0074194 A1 | 3/2010 | Liu et al. | | |
| 2010/0091669 A1 | 4/2010 | Liu et al. | | |
| 2010/0176933 A1 * | 7/2010 | Barragan Trevino | | G06Q 10/00 340/10.32 |
| 2010/0191370 A1 * | 7/2010 | Barragan Trevino | | G06Q 10/06 700/244 |
| 2011/0280170 A1 * | 11/2011 | Bowser | | G06F 1/3203 370/311 |
| 2011/0299422 A1 * | 12/2011 | Kim | | H04W 48/16 370/253 |
| 2012/0140652 A1 * | 6/2012 | Pan | | H04B 7/15592 370/252 |
| 2013/0170374 A1 * | 7/2013 | Aljadeff | | G01S 5/14 370/252 |

* cited by examiner

SYSTEM AND METHOD FOR CONVERGENCE AND AUTOMATIC DISABLING OF ACCESS POINTS IN A WIRELESS MESH NETWORK

CROSS-REFERENCE TO RELATED APPLICATIONS

This application is a continuation of the co-pending U.S. patent application titled, "SYSTEM AND METHOD FOR CONVERGENCE AND AUTOMATIC DISABLING OF ACCESS POINTS IN A WIRELESS MESH NETWORK," filed on Dec. 28, 2011 and having Ser. No. 13/339,071, now U.S. Pat. No. 9,173,111, issued Oct. 27, 2015. The subject matter of this related application is hereby incorporated herein by reference.

BACKGROUND OF THE INVENTION

1. Field of the Invention

Embodiments of the present invention relate generally to wireless digital communication systems and methods and, more specifically, to a system and method for convergence and automatic disabling of access points in a wireless mesh network.

2. Description of the Related Art

A conventional wireless mesh network includes a plurality of nodes, each incorporating a network interface. A given node may transmit payload data to one or more other nodes via the network interface. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network. A given node may send payload data directly to a corresponding access point. Additionally, the node may forward payload data to the access point on behalf of one or more other nodes within the wireless mesh network. The access point collects payload data for various nodes within the wireless mesh network and forwards the payload data to the related service system through some form of system network such as a wide-area network (WAN).

A network system includes a plurality of wireless mesh networks, where each wireless mesh network may include an arbitrary number of nodes and access points. At least one access point within each wireless mesh network bridges communications for the nodes within the respective wireless mesh network. In this way, the related service system may reach any number of access points, where each access point in turn is in communication with a plurality of nodes. The number of access points and nodes in a given wireless mesh network may be fixed, with each access point configured to bridge data communications for a fixed group of nodes. The number of nodes serviced by an access point may be fixed such that the access point can receive the payload data for all corresponding nodes, even under poor communications conditions.

In some network systems, a transaction cost may be associated with transmitting payload data from one node to another node, or from one node to a corresponding access point. In addition, a transaction cost may be associated with transmitting payload data from an access point to the related service system. In at least some wireless mesh networks, the transaction cost to transmit payload data from the access point to the service system may be relatively high compared to the transaction cost to transmit payload data from one node to another node, or from one node to the corresponding access point.

One disadvantage of this approach is that, because the number of access points is fixed, the capacity of each access point may be underutilized when communications conditions are favorable. Because the number of nodes per access point is fixed at a relatively low number to accommodate poor communications conditions, a particular access point may be able to accommodate more nodes under good communications conditions but is unable to do so. Another disadvantage of this approach is that transaction costs may be higher than necessary, particularly when communications conditions are favorable. When transaction costs from the access points to the service system are relatively high, the cost per packet of payload data is also relatively high, especially where the number of nodes (and correspondingly the amount of payload data) per access point is fixed at a low value to accommodate poor communications conditions.

As the foregoing illustrates, what is needed in the art is a more efficient technique for convergence and automatic disabling of access points in a wireless mesh network.

SUMMARY OF THE INVENTION

One embodiment of the present invention sets forth a computer-implemented method for participating as a node within a network. A node is configured to compute a value associated with at least one network metric. The node measures the one or more network metrics against a predetermined value. The node then determines whether to participate as an active node within the network based on the value of the one or more network metrics relative to the predetermined value.

Other embodiments include, without limitation, a computer-readable medium that includes instructions that enable a processing unit to implement one or more aspects of the disclosed methods as well as a system configured to implement one or more aspects of the disclosed methods.

One advantage of this approach is that cost savings may be achieved when the number of access points dynamically changes to accommodate varying communications conditions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
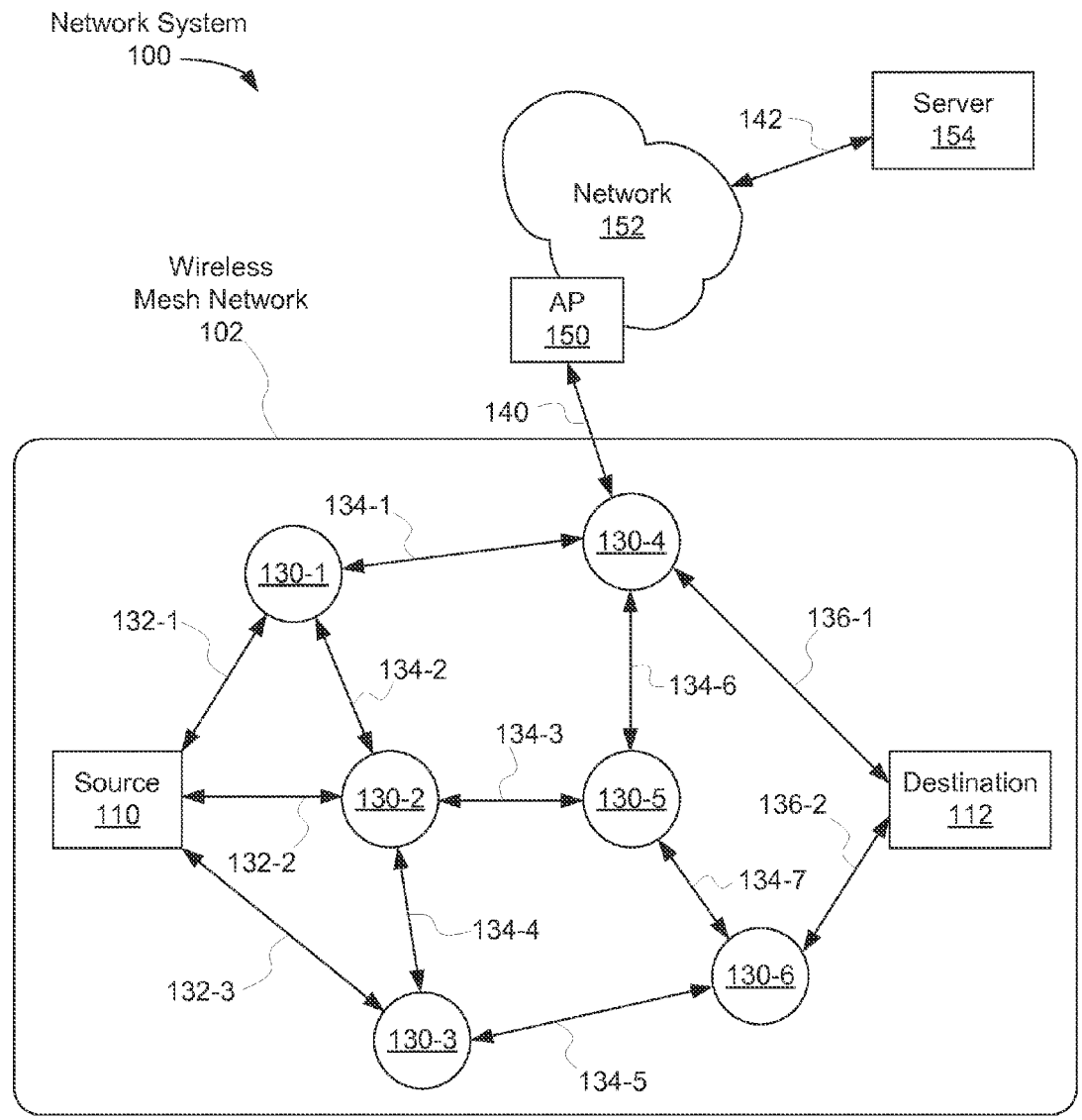
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

As shown, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 may be coupled to the server 154 via communications link 142. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

Figure 2A:
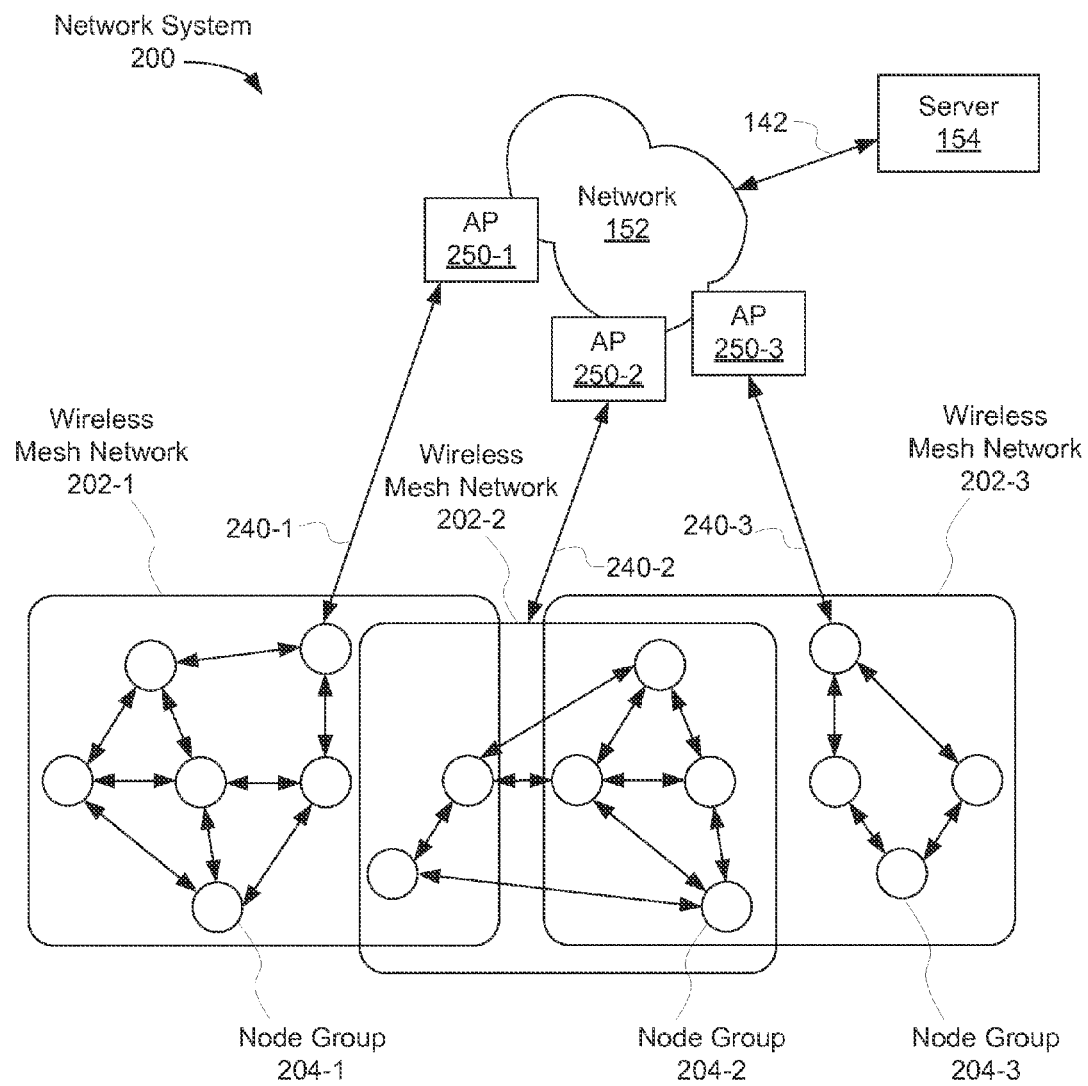
FIG. 2A illustrates a network system with a plurality of access points, according to an alternative embodiment of the invention.

FIG. 2A illustrates a network system 200 with a plurality of access points 250, according to an alternative embodiment of the invention. As shown, the network system 200 comprises one or more wireless mesh networks 202, access points 250, a network 152, and a server 154. Each wireless mesh network 202 includes one or more nodes within a node group 204. The wireless mesh networks 202, access points 250, network 152, server 154, and the nodes within each of the node groups 204 function essentially as discussed above in conjunction with FIG. 1.

In this network system 200, each access point 250 facilitates transmission of payload data for a subset of nodes and the network 152. For example, communications link 240-1 may be established between the access point 250-1 and a node within a node group 204-1 to facilitate transmission of payload data between wireless mesh network 202-1 and network 152. Correspondingly, communications link 240-2 may be established between the access point 250-2 and a node within a node group 204-2 to facilitate transmission of payload data between wireless mesh network 202-2 and network 152. Communications link 240-3 may be established between the access point 250-3 and a node within a node group 204-3 to facilitate transmission of payload data between wireless mesh network 202-3 and network 152. Each access point 250 is coupled to the network 152, which in turn is coupled to the server 154 via communications link 142. Each access point 250 evaluates various input parameters to compute one or more network metrics in order to determine whether communications conditions within the network system 200 are favorable or unfavorable. For example, favorable communications conditions may be indicated by the value of various network metrics including, without limitation, low routing costs, low hop counts to other access points 250 or nodes 130, or low utilization. Correspondingly, unfavorable communications conditions may be indicated by the value of various network metrics including, without limitation, high routing costs, high hop counts to other access points 250 or nodes 130, or high utilization. If an access point 250 determines that conditions are favorable, then the access point 250 may decide to no longer participate in the network system 200 and turns off the access point's 250 network connection. By not participating in the network system 200, the access point 250 may reduce network traffic and decrease operational costs related to communications with the network 152 and with the wireless mesh network 102.

Before turning off the network connection, the access point 250 may wait a random amount of time and repeat the computation of the network metrics. If the network metrics are still favorable, then the access point 250 may decide to no longer participate in the network system 200 and then turns off the access point's 250 network connection. Delaying for a random time period and repeating the computation may prevent the access point 250 from changing rapidly and repeatedly between online and offline states, a phenomenon known as flapping.

The access point 250-2 may use any number of network metrics to determine whether to participate in the network system 200. For example, access point 250-2 may compute the routing costs to one or more other access points 250. If the routing costs are low, then the access point 250-2 may determine that communications conditions are favorable. Conversely, high routing costs indicate that communications conditions are unfavorable. In another example, access point 250-2 may compute a first hop count between the access point 250-2 and neighboring access point 250-1 and a second hop count between the access point 250-2 and the farthest node within node group 204-2. Access point 250-2 then computes a function of these two hop counts, such as a weighted average, to determine whether overall network conditions are favorable or unfavorable. In another example, the access point 250-2 may compare the access point's 250-2 to the average utilization of all access points 250. Low utilization may indicate favorable communications conditions. If one or more network metrics indicate favorable communications conditions, then the access point 250-2 may wait a random amount of time and repeat the computation of the network metrics. If the network metrics are still favorable, then the access point 250-2 may decide to no longer participate in the network system 200 and turns off the access point's 250-2 network connection.

Figure 2B:
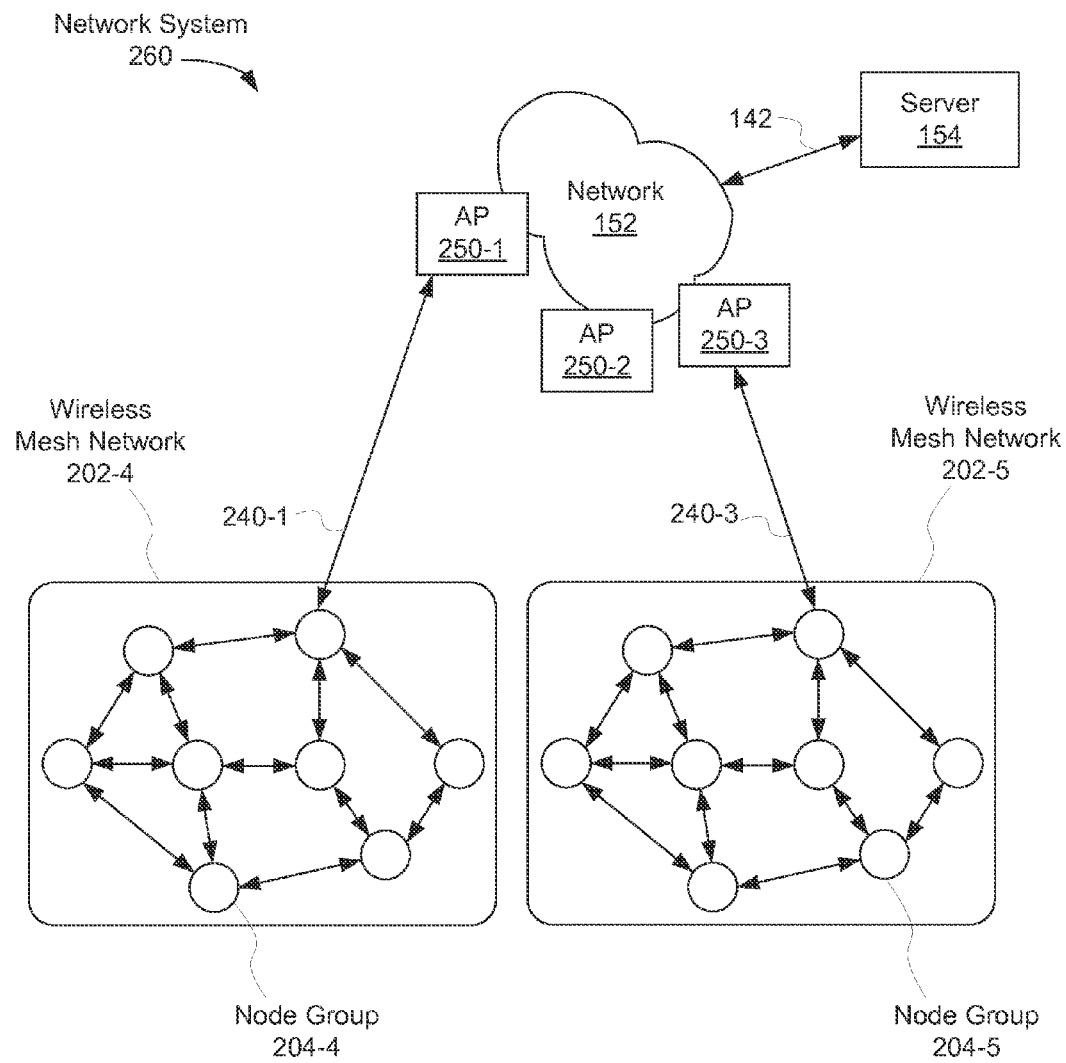
FIG. 2B illustrates a network system with a plurality of access points, according to another alternative embodiment of the invention.

FIG. 2B illustrates a network system 260 with a plurality of access points 250, according to another alternative embodiment of the invention. As shown, the network system 260 comprises one or more wireless mesh networks 202, access points 250, a network 152, and a server 154. Each wireless mesh network 202 includes one or more nodes within a node group 204. The wireless mesh networks 202, access points 250, network 152, server 154, and the nodes within each of the node groups 204 function essentially as discussed above in conjunction with FIGS. 1 and 2A.

In this network system 260, access point 250-2 is not participating within the network system 260. The nodes within access point's 250-2 prior node group 204 have realigned themselves to communicate with neighboring access points 250-1 and 250-3. Accordingly, wireless mesh network 202-4 contains an expanded node group 204-4. Access point 250-1 facilitates transmission of payload data between wireless mesh network 202-4, and network 152 via communications link 240-1. Correspondingly, wireless mesh network 202-5 contains an expanded node group 204-5. Access point 250-3 facilitates transmission of payload data between wireless mesh network 202-5 and network 152 via communications link 240-3. Each active access point 250 is coupled to the network 152, which in turn is coupled to the server 154 via communications link 142. Each access point 250 evaluates various input parameters to compute one or more network metrics in order to determine whether communications conditions within the network system 260 are favorable or unfavorable. If an access point 250 determines that conditions are unfavorable, then an access point 250 may decide to start participating in the network system 260 and turns on the access point's 250 network connection. By participating in the network system 200, the access point 250 may improve communications reliability or overall network performance.

Before turning on the network connection, the access point 250 may wait a random amount of time and repeat the computation of the network metrics. If the network metrics are still unfavorable, then the access point 250 may decide to participate in the network system 260 and then turns on the access point's 250 network connection. Delaying for a random time period and repeating the computation may prevent the access point 250 from changing rapidly and repeatedly between online and offline states, a phenomenon known as flapping.

The access point may use any number of network metrics to determine whether to participate in the network system 260. For example, access point 250-2 may determine that a particular route has dropped for more than a specified amount of time. In another example, the access point 250-2 may query a neighboring access point 250-1 to receive the access point's 250-1 utilization level. If the utilization of access point 250-1 is above a critical level, then the access point 250-2 may decide to participate in the network system 260. In another example, access point 250-2 may determine that the utilization of access point 250-1 is less than critical, but access point 250-1 has a utilization level that is high compared to the average utilization level of other access points 250 in the network system 260. In another example, access point 250-2 may determine that one or more routing parameters have degraded more than a specified percentage value since access point 250-2 last participated in the network system 260. If any one or more of these network parameters indicate that communications conditions within the network are unfavorable, then the access point 250-2 may wait a random amount of time and repeat the computation of the network metrics. If the network metrics are still unfavorable, then the access point 250-2 may decide to participate in the network system 260 and then turns on the access point's 250-2 network connection. Nodes within the node groups 204 of the existing wireless mesh networks 202 may then begin to route through access point 250-2.

Figure 3:
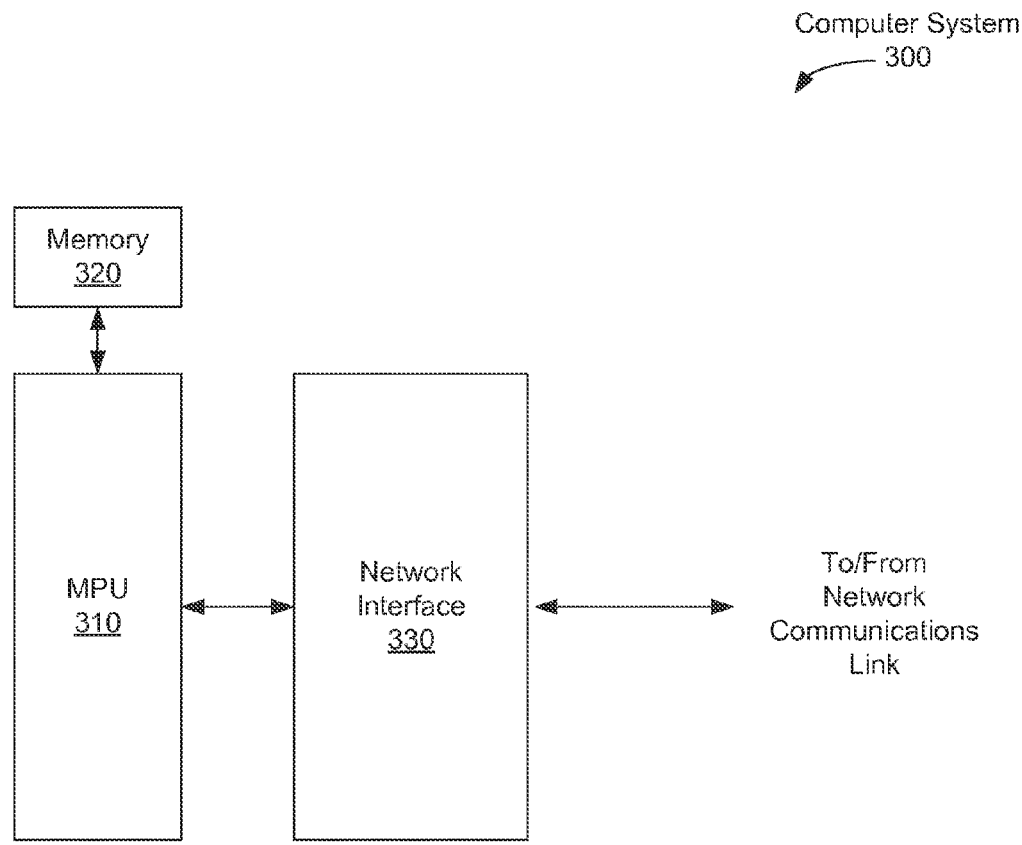
FIG. 3 illustrates a computer system configured to implement one or more aspects of the present invention.

FIG. 3 illustrates a computer system 300 configured to implement one or more aspects of the present invention. Each node 110, 112, 130 and each access point 150, 250 within the wireless mesh network 102, 202 of FIGS. 1-2B typically includes at least one instance of the computer system 300. As shown, the computer system 300 may include, without limitation, a microprocessor unit (MPU) 310, a memory 320, and a network interface 330. In one embodiment, the MPU 310 implements procedures for processing IP packets transmitted or received as payload data by the computer system 300. The procedures for processing the IP packets may include, without limitation, wireless routing, encryption, authentication, protocol translation, and routing between and among different wireless and wired network ports. A memory 320 may be coupled to the MPU 310 for local program and data storage.

A network interface 330 may be coupled to implement, without limitation, one or more the communication links 132, 134, 136, 140. The network interface 330 may utilize any technically feasible network protocol including, without limitation, a WAN or a local-area network (LAN). Moreover, multiple network types may be implemented within a given network interface 330. For example, communications between two nodes 130 or between a node 130 and the corresponding access point 150 may be via a radio-frequency local-area network (RF LAN), while communications between access points 150 and the network 152 may be via a WAN such as a general packet radio service (GPRS) network.

Figure 4A:
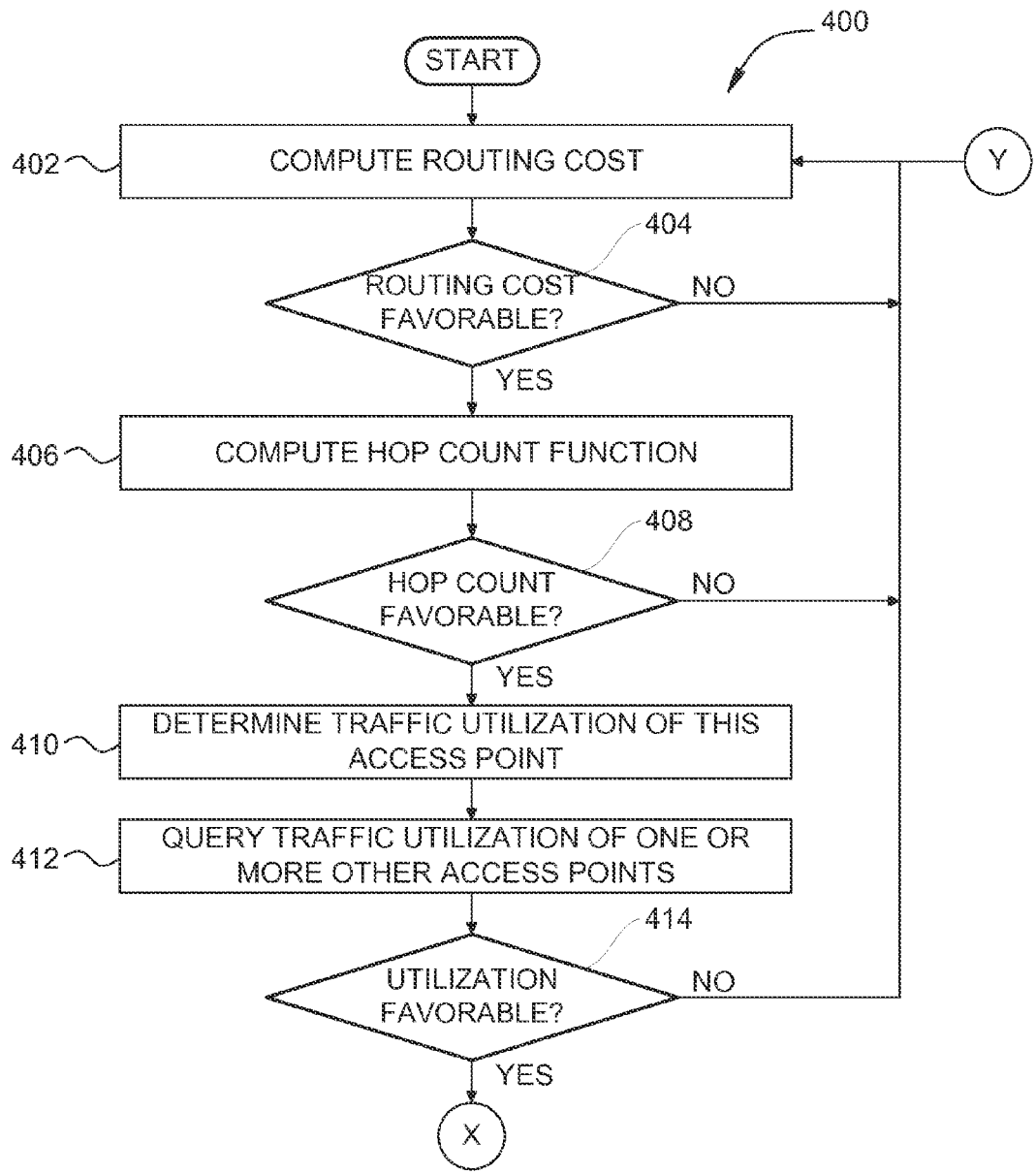
FIGS. 4A and 4B set forth a flow diagram of method steps for disabling network participation associated with an access point, according to one embodiment of the present invention.
Figure 4B:
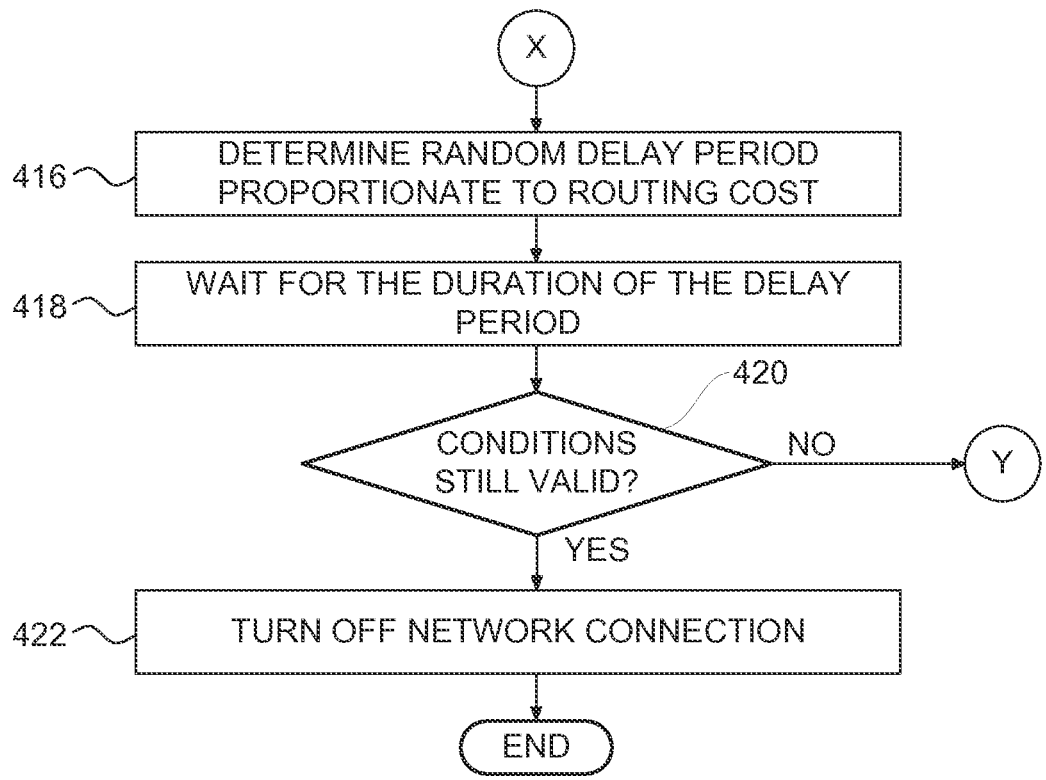

FIGS. 4A and 4B set forth a flow diagram of method steps 400 for disabling network participation associated with an access point 250, according to one embodiment of the present invention. Although the method steps 400 are described in conjunction with the systems of FIGS. 1-3, persons of ordinary skill in the art will understand that any system configured to perform the method steps 400, in any order, is within the scope of the present invention.

The method 400 begins at step 402, where the access point 250 computes a first network metric. For example, the access point 250 may measure the routing cost from the access point's 250 corresponding nodes 130 to other nearby access points 250. At step 404, the access point 250 compares the first network metric to a predetermined condition to determine whether the metric is favorable or unfavorable. For example, the access point 250 may compare the routing cost to other access points 250 to a specific preset value. If the network metric is unfavorable (for example, the routing cost is greater than or equal to a preset value), then the method 400 returns to step 402. If the network metric is favorable (for example, the routing cost is less than a preset value), then the method 400 proceeds to step 406, where the access point 250 computes a second network metric. At step 408, the access point 250 compares the second network metric to a predetermined condition to determine whether the metric is favorable or unfavorable. For example, the access point 250 may measure a value based on the hop count from the access point 250 to the nearest neighbor access point 250 and the hop count from the access point 250 to the farthest corresponding node 130. If the network metric is unfavorable (for example, the function based on the hop counts is greater than or equal to a preset value), then the method 400 returns to step 402. If the network metric is favorable (for example, the function based on the hop counts is less than a preset value), then the method 400 proceeds to step 410.

At step 410, the access point 250 computes a third network metric. For example, the access point 250 measures a traffic utilization value. For example, the access point 250 may compute the amount of data being forwarded to the server 154 as compared to the access point's 250 total data transmission capacity. At step 412, the access point 250 queries one or more other access points 250 to receive the traffic utilization values of these other access points 250. At step 414, the access point 250 compares the access point's 250 own traffic utilization with the traffic utilization of the queried access points 250 according to some weighted function. If the access point's 250 weighted traffic utilization is unfavorable (for example, the weighted traffic utilization is greater than or equal to a preset value), then the method 400 returns to step 402. If the weighted traffic utilization is favorable (for example, the weighted traffic utilization is less than a preset value), then the method 400 proceeds to step 416, where the access point 250 computes a random delay period proportionate to the routing cost within the wireless mesh network 202. At step 418, the access point 250 waits for the duration of the computed delay period. This delay prevents the access point 250 from disabling the access point's 250 network connection prematurely. At step 420, the access point 250 determines whether all conditions are still valid. For example, the access point 250 determines whether the network metrics and weighted traffic utilization are all still favorable. If any one or more of the network metrics or weighted traffic utilization are now unfavorable, then the method 400 returns to step 402. If the network metrics and weighted traffic utilization are all still favorable, then the method 400 proceeds to step 422, where the access point 250 ceases participation in the network by turning off the connection to the network via the network interface 330. The method 400 then terminates.

Figure 5A:
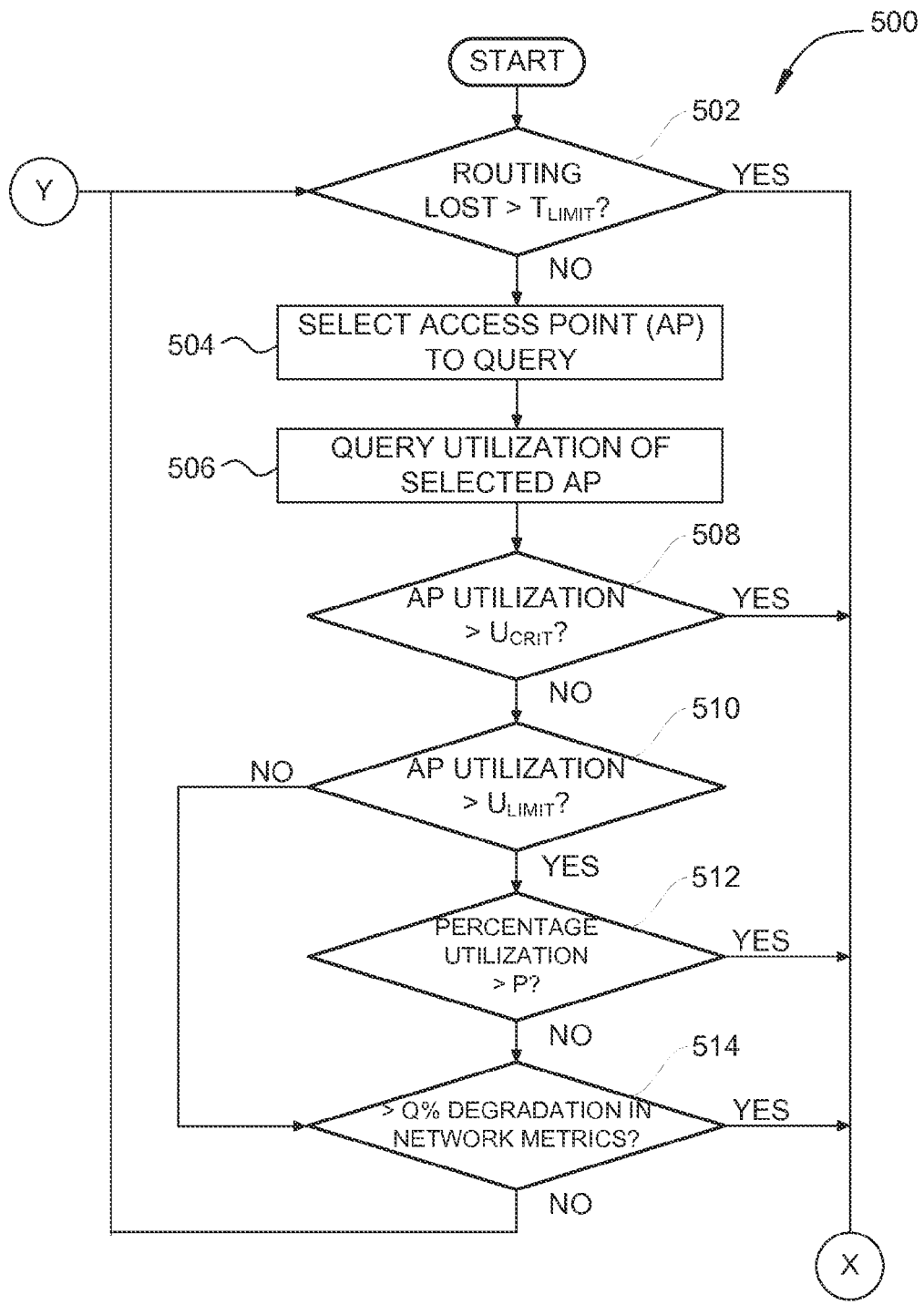
FIGS. 5A and 5B set forth a flow diagram of method steps for network participation associated with an access point, according to one embodiment of the present invention.
Figure 5B:
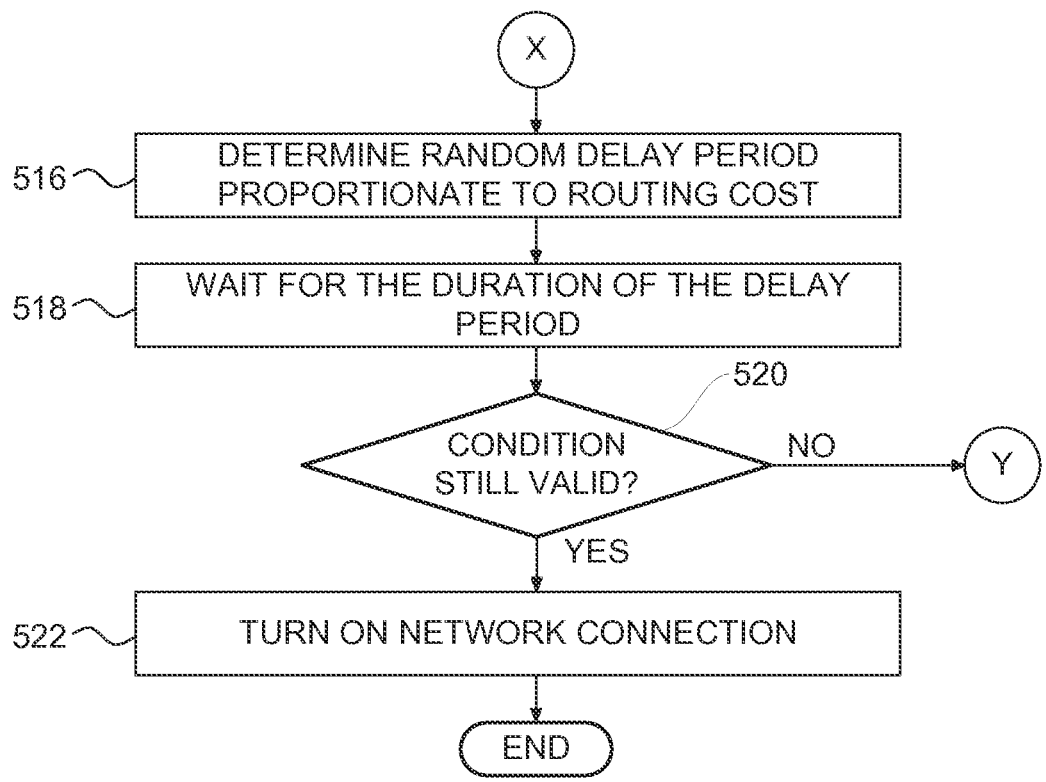

FIGS. 5A and 5B set forth a flow diagram of method steps 500 for network participation associated with an access point 250, according to one embodiment of the present invention. Although the method steps 500 are described in conjunction with the systems of FIGS. 1-3, persons of ordinary skill in the art will understand that any system configured to perform the method steps 500, in any order, is within the scope of the present invention.

The method 500 begins at step 502, where the access point 250 computes a first network metric. For example, the access point 250 measures whether routing connectivity has been lost for more than a predetermined amount of time $T_{LIMIT}$. If connectivity has been lost for more than $T_{LIMIT}$, then the method 500 proceeds to step 516, where the access point 250 computes a random delay period proportionate to the routing cost within the wireless mesh network 202. At step 518, the access point 250 waits for the duration of the computed delay period. This delay prevents the access point 250 from enabling the access point's 250 network connection prematurely. At step 520, the access point 250 determines whether the condition is still valid. For example, the access point 250 determines whether the routing connectivity is still lost. If the condition is no longer valid, then the method 500 returns to step 502. If the condition is still valid, then the method 500 proceeds to step 522, where the access point 250 turns on the connection to the network. The method 500 then terminates.

Returning to step 502, if routing connectivity has not been lost, or has been lost for a time period no greater than $T_{LIMIT}$, then the method 500 proceeds to step 504, computes a second network metric. For example, the access point 250 where the access point 250 selects a neighboring access point 250 to query. At step 506, the access point 250 queries the neighboring access point 250 as to the neighboring access point's 250 utilization. At step 508, the access point 250 determines whether the utilization of the neighboring access point 250 is greater than a critical value $U_{CRIT}$. If the neighboring access point's 250 utilization is greater than $U_{CRIT}$, then the method 500 proceeds to step 516, where the access point 250 computes a random delay period proportionate to the routing cost within the wireless mesh network 202. At step 518, the access point 250 waits for the duration of the computed delay period. This delay prevents the access point 250 from enabling the access point's 250 network connection prematurely. At step 520, the access point 250 determines whether the condition is still valid. For example, the access point 250 determines whether the neighboring access point's 250 utilization is still greater than $U_{CRIT}$. If the condition is no longer valid, then the method 500 returns to step 502. If the condition is still valid, then the method 500 proceeds to step 522, where the access point 250 begins participation in the network by turning on the connection to the network via the network interface 330. The method 500 then terminates.

Returning to step 508, if the neighboring access point's 250 utilization is not greater than $U_{CRIT}$, then the method 500 proceeds to step 510, where the access point 250 determines whether the utilization of the neighboring access point 250 is greater than some other value $U_{LIMIT}$, where $U_{LIMIT}$ is typically below $U_{CRIT}$. If the neighboring access point's 250 utilization is greater than $U_{LIMIT}$, then the method 500 proceeds to step 512, where the access point 250 determines whether the utilization of the neighboring access point 250 is greater than some percentage P of the utilization for the entire network system. If the percentage utilization P is greater than a predetermined value, then the method 500 proceeds to step 516, where the access point 250 computes a random delay period proportionate to the routing cost within the wireless mesh network 202. At step 518, the access point 250 waits for the duration of the computed delay period. This delay prevents the access point 250 from enabling the access point's 250 network connection prematurely. At step 520, the access point 250 determines whether the condition is still valid. For example, the access point 250 determines whether the percentage utilization is still greater than P. If the condition is no longer valid, then the method 500 returns to step 502. If the condition is still valid, then the method 500 proceeds to step 522, where the access point 250 turns on the connection to the network. The method 500 then terminates.

Returning to step 510, if the utilization of the neighboring access point 250 is not greater than $U_{LIMIT}$, then the method 500 proceeds to step 514, where the access point 250 computes a third network metric. For example, the access point 250 determines whether one or more routing metrics have degraded more than some percentage Q. If the one or more network metrics have degraded more than Q percent, then the method 500 proceeds to step 516, where the access point 250 computes a random delay period proportionate to the routing cost within the wireless mesh network 202. At step 518, the access point 250 waits for the duration of the computed delay period. This delay prevents the access point 250 from enabling the access point's 250 network connection prematurely. At step 520, the access point 250 determines whether the condition is still valid. For example, the access point 250 determines whether the one or more network metrics are still at a degradation level of more than Q percent. If the condition is no longer valid, then the method 500 returns to step 502. If the condition is still valid, then the method 500 proceeds to step 522, where the access point 250 turns on the connection to the network. The method 500 then terminates.

Returning to step 514, if the one or more network metrics have not degraded more than Q percent, then the method 500 returns to step 502.

Returning to step 512, if the percentage utilization of the neighboring access point 250 is not greater than P, then the method 500 proceeds to step 514 and continues from there as set forth above.

In sum, the disclosed technique provides an improved way for convergence and automatic disabling of access points 250 in a wireless mesh network 202. Specifically, an access point 250 within a wireless mesh network 202 computes one or more network metrics to determine whether the metrics are unfavorable or favorable. The access point then computes the access point's 250 traffic utilization as compared to the traffic utilization of one or more neighboring access points 250. If the network metrics are favorable, then the access point 250 then waits for random delay period proportionate to the routing cost within the wireless mesh network 202. If the network metrics are all still favorable, then the access point 250 disables the access point's 250 network connection. The nodes 130 which had previously utilized this access point 250 for forwarding payload data connect to a neighboring access point 250 with an enabled network connection. Correspondingly, an access point 250 determines whether to turn the network connection back on based on whether a routing was lost for at least a preset amount of time, utilization of one or more neighboring access points 250 is above a preset value, or one or more network metrics have degraded by a certain percentage value. If any of these conditions have occurred, then the access point waits for a random delay period. If one or more of the conditions that triggered the delay period are still valid, then the access point 250 enables the network connection. Once an access point 250 enables the network connection, nodes 130 may then connect to the access point 250 and form a new wireless mesh network 202.

Advantageously, cost savings may be achieved when the number of access points 250 dynamically changes to accommodate varying communications conditions. An access point 250 may disable and enable the access point's 250 network connection in response to communications conditions as those conditions improve or degrade. Where communications conditions are favorable, one more access points 250 may disable the access point's 250 network connections, decreasing the number of access points 250 that forward date to the server. This in turn reduces the number of transactions between access points 250 and the server 154, which in turn reduces transaction costs. When communications conditions degrade, access points 250 enable their corresponding network connections until routing costs and utilization are sufficiently favorable.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for connecting as an access point to a mesh network, the method comprising:

evaluating at least one network metric associated with the mesh network;
determining that a value associated with the at least one network metric relative to a threshold value indicates that a network connection to connect as an access point to the mesh network should be turned on;
waiting for a delay period;
re-evaluating the at least one network metric after the delay period has elapsed;
confirming that the value associated with the at least one network metric relative to the threshold value still indicates that the network connection to connect as an access point to the mesh network should be turned on; and
in response, turning on the network connection to connect as an access point to the mesh network.

2. The method of claim 1, wherein the at least one network metric comprises routing connectivity within the mesh network, and determining that the value associated with the at least one network metric relative to a threshold value indicates comprises determining that the routing connectivity within the mesh network has not been lost or has been lost for less than a predetermined amount of time.

3. The method of claim 1, wherein the at least one network metric comprises a utilization level of a first access point associated with the mesh network, and determining that the value associated with the at least one network metric relative to a threshold value indicates comprises determining that the utilization level of the first access point is greater than a critical value.

4. The method of claim 1, wherein the at least one network metric comprises a utilization level of a first access point associated with the mesh network, and determining that the value associated with the at least one network metric relative to a threshold value indicates comprises determining that the utilization level of the first access point is greater than a predetermined limit that is less than a critical value.

5. The method of claim 1, wherein the at least one network metric comprises a utilization level of a first access point associated with the mesh network, and determining that the value associated with the at least one network metric relative to a threshold value indicates comprises determining that the utilization level of the first access point is greater than a predetermined percentage of the overall utilization of the mesh network.

6. The method of claim 1, wherein the at least one network metric comprises a first network metric that is not a utilization level of a first access point associated with the mesh network, and determining that the value associated with the at least one network metric relative to a threshold level indicates comprises determining that the first network metric has degraded by a predetermined amount.

7. The method of claim 1, wherein the delay period is proportionate to a routing cost within the mesh network.

8. The method of claim 1, wherein evaluating the at least one network metric comprises selecting a first access point associated with the mesh network to query, and querying the first access point to determine a utilization level of the first access point.

9. A non-transitory computer readable storage medium including instructions that, when executed by a processor residing within a node of a mesh network, cause the processor to perform the steps of:
evaluating at least one network metric associated with the mesh network;
determining that a value associated with the at least one network metric relative to a threshold value indicates that a network connection to connect the node as an access point to the mesh network should be turned on;
waiting for a delay period;
re-evaluating the at least one network metric after the delay period has elapsed;
confirming that the value associated with the at least one network metric relative to the threshold value still indicates that the network connection to connect the node as an access point to the mesh network should be turned on; and
in response, turning on the network connection to connect the node as an access point to the mesh network.

10. The non-transitory computer-readable medium of claim 9, wherein the at least one network metric comprises routing connectivity within the mesh network, and determining that the value associated with the at least one network metric relative to a threshold value indicates comprises determining that the routing connectivity within the mesh network has not been lost or has been lost for less than a predetermined amount of time.

11. The non-transitory computer-readable medium of claim 9, wherein the at least one network metric comprises a utilization level of a first access point associated with the mesh network, and determining that the value associated with the at least one network metric relative to a threshold value indicates comprises determining that the utilization level of the first access point is greater than a critical value.

12. The non-transitory computer-readable medium of claim 9, wherein the at least one network metric comprises a utilization level of a first access point associated with the mesh network, and determining that the value associated with the at least one network metric relative to a threshold value indicates comprises determining that the utilization level of the first access point is greater than a predetermined limit that is less than a critical value.

13. The non-transitory computer-readable medium of claim 9, wherein the at least one network metric comprises a utilization level of a first access point associated with the mesh network, and determining that the value associated with the at least one network metric relative to a threshold value indicates comprises determining that the utilization level of the first access point is greater than a predetermined percentage of the overall utilization of the mesh network.

14. The non-transitory computer-readable medium of claim 9, wherein the at least one network metric comprises a first network metric that is not a utilization level of a first access point associated with the mesh network, and determining that the value associated with the at least one network metric relative to a threshold level indicates comprises determining that the first network metric has degraded by a predetermined amount.

15. The non-transitory computer-readable medium of claim 9, wherein the delay period is proportionate to a routing cost within the mesh network.

16. The non-transitory computer-readable medium of claim 9, wherein evaluating the at least one network metric comprises selecting a first access point associated with the mesh network to query, and querying the first access point to determine a utilization level of the first access point.

17. A network node device, comprising:
a memory including instructions; and
a processor that is coupled to the memory and, upon executing the instructions, is configured to:
evaluate at least one network metric associated with the mesh network;
determine that a value associated with the at least one network metric relative to a threshold value indicates that a network connection to connect the network node device as an access point to the mesh network should be turned on;

wait for a delay period;

re-evaluate the at least one network metric after the delay period has elapsed;

confirm that the value associated with the at least one network metric relative to the threshold value still indicates that the network connection to connect the network node device as an access point to the mesh network should be turned on; and in response, turn on the network connection to connect the network node device as an access point to the mesh network.

18. The network node device of claim 17, wherein the processor is configured to evaluate the at least one network metric by selecting a first access point associated with the mesh network to query, and querying the first access point to determine a utilization level of the first access point.

19. The network node device of claim 18, wherein the processor is configured to determine that the value associated with the at least one network metric relative to a threshold value indicates by determining that the utilization level of the first access point is greater than a critical value.

20. The network node device of claim 18, wherein the processor is configured to determine that the value associated with the at least one network metric relative to a threshold value indicates by determining that the utilization level of the first access point is greater than a predetermined limit that is less than a critical value.

21. The network node device of claim 18, wherein the processor is configured to determine that the value associated with the at least one network metric relative to a threshold value indicates by determining that the utilization level of the first access point is greater than a predetermined percentage of the overall utilization of the mesh network.

* * * * *